United States Patent
Yu

(10) Patent No.: US 9,212,965 B2
(45) Date of Patent: Dec. 15, 2015

(54) LEAK DETECTION DEVICE AND REMOTE MONITORING SYSTEM HAVING SLAVE CONTROLLERS WITH UNIQUE IDS

(71) Applicants: Hong Geun Yu, Gyeonggi-do (KR); YUMIN SYSTEM TECHNOLOGY CO., LTD., Gyeonggi-do (KR)

(72) Inventor: Hong Geun Yu, Gyeonggi-do (KR)

(73) Assignees: Hong Geun Yu, Gyeonggi-Do (KR); YUMIN SYSTEM TECHNOLOGY CO., LTD., Gyeonggi-Do (KR)

(*) Notice: Subject to any disclaimer, the term of this patent is extended or adjusted under 35 U.S.C. 154(b) by 155 days.

(21) Appl. No.: 14/067,440

(22) Filed: Oct. 30, 2013

(65) Prior Publication Data
US 2015/0116118 A1    Apr. 30, 2015

(30) Foreign Application Priority Data
Oct. 29, 2013  (KR) .................. 10-2013-0128946

(51) Int. Cl.
G08B 21/00   (2006.01)
G01M 3/16    (2006.01)
G08B 21/18   (2006.01)
G08B 25/00   (2006.01)

(52) U.S. Cl.
CPC ............. *G01M 3/165* (2013.01); *G08B 21/18* (2013.01); *G08B 25/009* (2013.01)

(58) Field of Classification Search
CPC ............................................. G08B 21/20
USPC .............. 340/603, 604, 605, 540; 137/312; 307/118
See application file for complete search history.

(56) References Cited

U.S. PATENT DOCUMENTS 6,229,229 B1 * 5/2001 Sharp ................. 307/118

* cited by examiner

*Primary Examiner* — Jeffrey Hofsass
(74) *Attorney, Agent, or Firm* — Rabin & Berdo, P.C.

(57) ABSTRACT

Disclosed herein are a leak detection device and a remote monitoring system using the same. In accordance with the present invention, locations where multiple leaks have occurred can be accurately determined by connecting a plurality of leak sensing films in series using a plurality of slave controllers having connectors, detecting a leak occurring between the slave controllers, and sending the detected leak to a master controller at a remote place. Furthermore, the present invention provides a remote monitoring system capable of checking whether a leak has occurred or not at a remote place using an apparatus for controlling the leak sensing films.

8 Claims, 5 Drawing Sheets

LEAK DETECTION DEVICE AND REMOTE MONITORING SYSTEM HAVING SLAVE CONTROLLERS WITH UNIQUE IDS

CROSS REFERENCE TO RELATED APPLICATION

The present application claims the benefit of Korean Patent Application No. 10-2013-0128946 filed in the Korean Intellectual Property Office on Oct. 29, 2013, the entire contents of which are incorporated herein by reference.

BACKGROUND OF THE INVENTION

1. Technical Field

The present invention relates to a leak detection sensor and a system capable of monitoring the leak detection sensor remotely and, more particularly, to a leak detection device having a tape form, which can determine accurate locations of multiple leaks when the leaks are detected and monitor the detected leaks at a remote place and a remote monitoring system using the same.

2. Description of the Related Art

When water or oil leaks, various types of leak sensors for detecting water leakage and oil leakage are used.

Representative sensors can include a cable type leak sensor, a band type leak sensor, and a module type leak sensor.

The cable type leak sensor is a water leakage and oil leakage detection sensor for detecting the exposure of various types of liquid (e.g., water and oil) and informing a point at which liquid leaks accurately and rapidly.

When an electric current flows through a conducting wire, voltage is changed (i.e., the generation of a potential) due to the resistance of leaked liquid. Water leakage or oil leakage and an accurate location of the water leakage or oil leakage can be checked by detecting the change of voltage using a detection line.

However, such a cable type leak sensor is expensive in its installation cost, and a customer has a narrow selection width because the length of a sensor cable is determined (e.g., 7 M, 15 M, and 30 M). Furthermore, there are problems in that installation is difficult and an extra cost is necessary because an additional bracket must be used when installing the cable type leak sensor. Furthermore, there are problems in that the time taken to remove a leak after detecting the leak is long and it is difficult to connect the cable type leak sensor to an external device.

When an electric current flows through an electric wire, a resistance value is changed when water comes in contact with the electric wire. The band type leak detection sensor can detect whether water leaks or not based on a change of the resistance value.

A resistance value that can be controlled through the band type leak detection sensor is 0Ω to 50 MΩ, output is 100 mA at 30 V DC (maximum), a maximum wire length is 50 m, and a maximum length of the band type leak detection sensor is 10 m.

Such a band type leak sensor can detect water leakage in a wide area at low cost and can be easily installed, but is problematic in that an error incidence is high due to high humidity or an external impact and an accurate water leakage location cannot be easily checked. Furthermore, the band type leak sensor has problems in that it has product installation coarseness due to lack installation connection and a high investment cost must be used in order to use a network or PC. Furthermore, a customer has a limited selection width because the length of the leak detection sensor cable is limited (e.g., 1 M, 2 M, 5 M, 10 M, and 20 M).

Furthermore, the band type leak sensor is problematic in that a price is high as compared with performance, installation is difficult and additional expenses are necessary because an additional bracket to be fixed to the bottom needs to be installed when installing the band type leak sensor, and an alternative connection device in addition to a simple relay contact point method is not present when connecting the band type leak sensor to an external device.

The module type leak sensor includes photo sensors (e.g., a light-receiving unit and a light-emitting unit) within a plastic casing. The light-receiving unit receives a beam from the light-emitting unit in the state in which liquid has not been detected, but when the beam of the light-emitting unit detects liquid, the beam does not travel to the light-receiving unit due to a change of a refractive index.

At this time, the module type leak sensor detects water leakage. The module type leak sensor has input voltage of 12 V DC to 24 V DC, a response time of 50 ms, and a usual temperature of $-10°$ C. to $60°$ C., and a sensor casing made of polypropylene.

The module type leak sensor can be easily installed, can detect a water leakage danger portion at low cost and generate an alarm and alarm lamp in itself irrespective of peripheral devices, and does not have an error attributable to humidity, but the module type leak sensor has problems in that it can check only whether a specific location leaks or not unlike a cable type leak sensor and it is difficult to connect the module type leak sensor to peripheral devices. Furthermore, the module type leak sensor has problems in that a lot of time is wasted in installing the module type leak sensor because an additional sensor fixing scheme must be planned and detection becomes difficult if a water leakage location is changed because only a specific portion of a water leakage danger area can be detected.

In order to solve the problems, the applicant of the present invention filed a number of applications regarding a tape type leak detection sensor, and an example of the application is Korean Patent Registration No. 10-0827385.

FIGS. 1 to 4 show the structure of a tape type leak detection sensor disclosed in Korean Patent Registration No. 10-0827385.

A leak sensing film 10 of a tape form includes an adhesive layer 20, a base film 30, a conductive line layer 40, and a protection film 50 which are sequentially stacked from the bottom to the top.

The adhesive layer 20 is attached to a position where a leak is generated and is formed in an adhesive tape form. The base film 30 is formed over the conductive line layer 40 and is made of PET, PE, PTFE, PVC, or other Teflon series for insulation purposes and so that the patterns of the conductive line layer 40 are formed on the base film 30 in a printing manner.

The conductive line layer 40 includes a plurality of resistance lines 41 and 42 and a plurality of signal lines 43 and 44 which are formed on a top surface of the base film 30 in a strip form. The pair of resistance lines 41 and 42 is spaced apart from each other and formed in parallel in the length direction of the leak sensing film 10, and the signal lines 43 and 44 are spaced apart from each other and formed in parallel in the length direction of the leak sensing film 10 outside the respective resistance lines 41 and 42.

Furthermore, the resistance line 41 and the signal line 43 are connected by an additional connector and the resistance line 42 and the signal line 44 are connected by an additional connector, at the end of the leak sensing film 10.

The protection film 50 is stacked over the conductive line layer 40 and configured to protect the patterns of the conductive line layer 40 from an external stimulus.

FIG. 2 is a diagram showing the state in which the conductive line layer 40 is formed. The conductive line layer 40 basically includes the resistance lines 41 and 42 printed using conductive ink and the signal lines 43 and 44 printed using a silver compound.

The resistance lines 41 and 42 and the signal lines 43 and 44 form a leak sensing circuit.

Furthermore, as shown in FIG. 3, sensing holes 51 are formed in the protection film 50 at specific intervals so that only the resistance lines 41 and 42 of the conductive line layer 40 are externally exposed through the sensing holes 51.

FIG. 4 is a diagram showing the state in which a plurality of the leak sensing films 10 is extended and connected and the plurality of the leak sensing films 10 is connected to a controller 2. If the distance for leak detection is relatively long, the plurality of leak sensing films 10 can be connected by a connector 70 so that they are extended in series.

Furthermore, the resistance lines 41 and 42 and the signal lines 43 and 44 are connected by a connector 60 so that they are connected to the controller 2 through a cable 1.

Therefore, when a leak L1 is generated in the leak sensing film 10, the leak L1 is introduced through the sensing holes 51 of the protection film 50 and the resistance lines 41 and 42 are electrified through the introduced leak L1.

Accordingly, a resistance value of the resistance lines 41 and 42 changes, and the changed resistance value is transmitted to the controller 2 through the signal lines 43 and 44. The controller 2 determines whether a leak has occurred or not based on a change of the resistance value and also determines the position of the leak L1 where the leak has occurred based on the amount of the changed resistance value.

That is, if the changed resistance value is great, it means that the position of the leak L1 where the leak has occurred is distant from the controller 2 by the amount of only the changed resistance value. If the changed resistance value is small, it means that the position of the leak L1 where the leak has occurred is close to the controller 2 by the amount of only the changed resistance value. Accordingly, an accurate location of the leak L1 can be determined based on a table value for the resistance value and the distance which is previously stored in the controller 2.

In such a case, however, if a leak detection range is a long distance, for example, 1 km or more, a plurality of the leak sensing films 10 connected in series is installed. If a plurality of leaks L1 and L2 is generated, the controller 2 can determine whether leaks have occurred or not, but cannot check the locations of the leaks L1 and L2.

That is, the controller 2 can check a position where a leak has occurred based on a change and amount of a resistance value when only one leak occurs. If the plurality of leaks L1 and L2 is generated, the controller 2 may check an erroneous resistance value for a different leak location because resistance values at locations where the leaks L1 and L2 have occurred are added and inputted to the controller 2.

In this case, there is a problem in that measures cannot be rapidly taken against the generation of leaks because an administrator must check a long-distance section one by one when the leaks are generated.

SUMMARY OF THE INVENTION

The present invention has been made keeping in mind the above problems occurring in the prior art, and an object of the present invention is to accurately determine locations where multiple leaks have occurred by connecting a plurality of leak sensing films in series using a plurality of slave controllers having connectors, detecting a leak occurring between the slave controllers, and sending the detected leak to a master controller at a remote place.

Another object of the present invention is to provide a remote monitoring system capable of checking whether a leak has occurred or not at a remote place using an apparatus for controlling the leak sensing films.

In an aspect of the present invention, a leak detection device includes a leak sensing film formed on a top surface of a base film in a tape form and configured to have a pair of resistance lines for detecting a leak formed in parallel in the length direction of the leak sensing film and a plurality of slave controllers configured to extend a plurality of the leak sensing films by connecting a plurality of the leak sensing films in series, wherein when a leak is detected from a leak sensing film, slave controllers connected to both ends of the leak sensing film add their own IDs to respective leak sensing signals and send the leak sensing signals to a master controller.

In another aspect of the present invention, a remote monitoring system using such a leak detection device includes a wireless communication module provided in the master controller of the leak detection device and configured to wirelessly send a leak sensing signal received from a slave controller, an integrated alarm module provided at a remote place and configured to wirelessly receive the leak sensing signal from the wireless communication module and send the received leak sensing signal, and a local PC configured to receive the leak sensing signal from the integrated alarm module, store and manage the received leak sensing signal, and generate an alarm according to whether or not a leak has occurred.

DESCRIPTION OF REFERENCE NUMERALS OF PRINCIPAL ELEMENTS IN THE DRAWINGS

Figure 1:
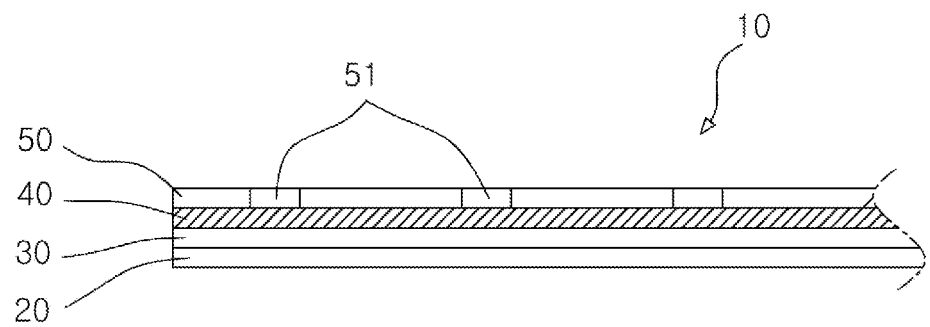
FIG. 1 is a diagram showing the cross section of a conventional leak detection device.
Figure 2:
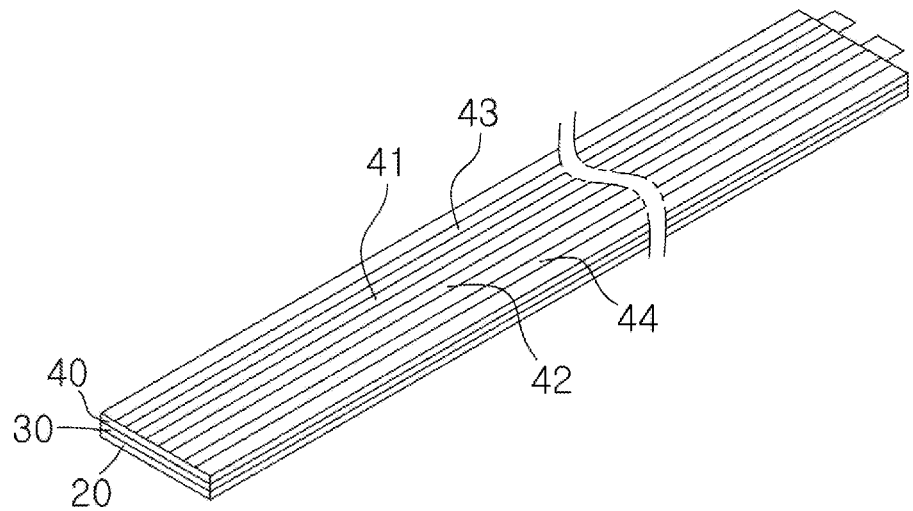
FIG. 2 is a diagram showing the structure of a conductive line layer of FIG. 1.
Figure 3:
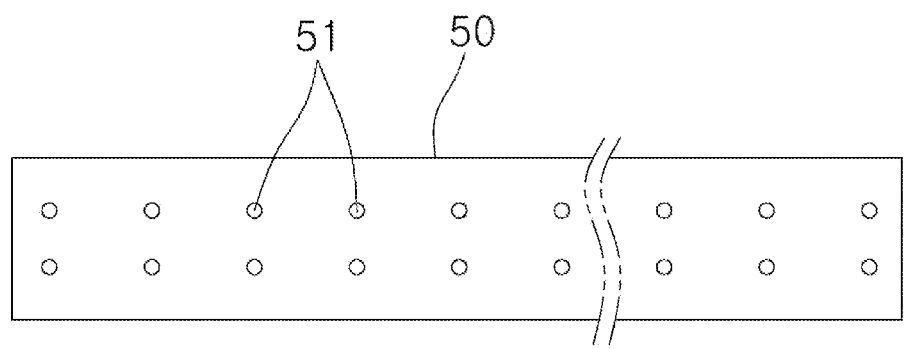
FIG. 3 is a diagram showing the structure of a protection film.
Figure 4:
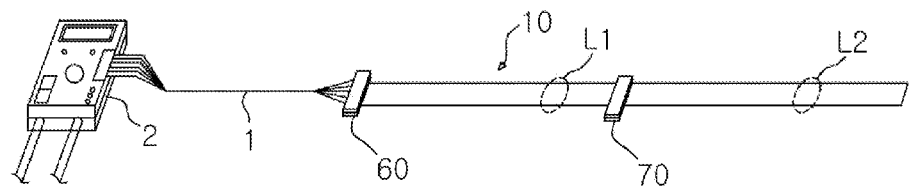
FIG. 4 is a diagram showing the state in which a leak sensing film and a master controller are connected.

100: leak sensing film
110: attachment layer
120: lower film
121, 122: power supply line
123, 124: communication line
130: upper film
131, 132: resistance line 140: protection film
141, 142: sensing holes
200: slave controller
210, 211: connector
220: PCB
221: controller
222: ID storage unit
223: amplification unit
224: ultrasonic transmitter
225: ultrasonic receiver
300: master controller
400: integrated alarm module
500: local PC

DETAILED DESCRIPTION

Hereinafter, the present invention is described in detail with reference to FIGS. 5 to 9.

Figure 5:
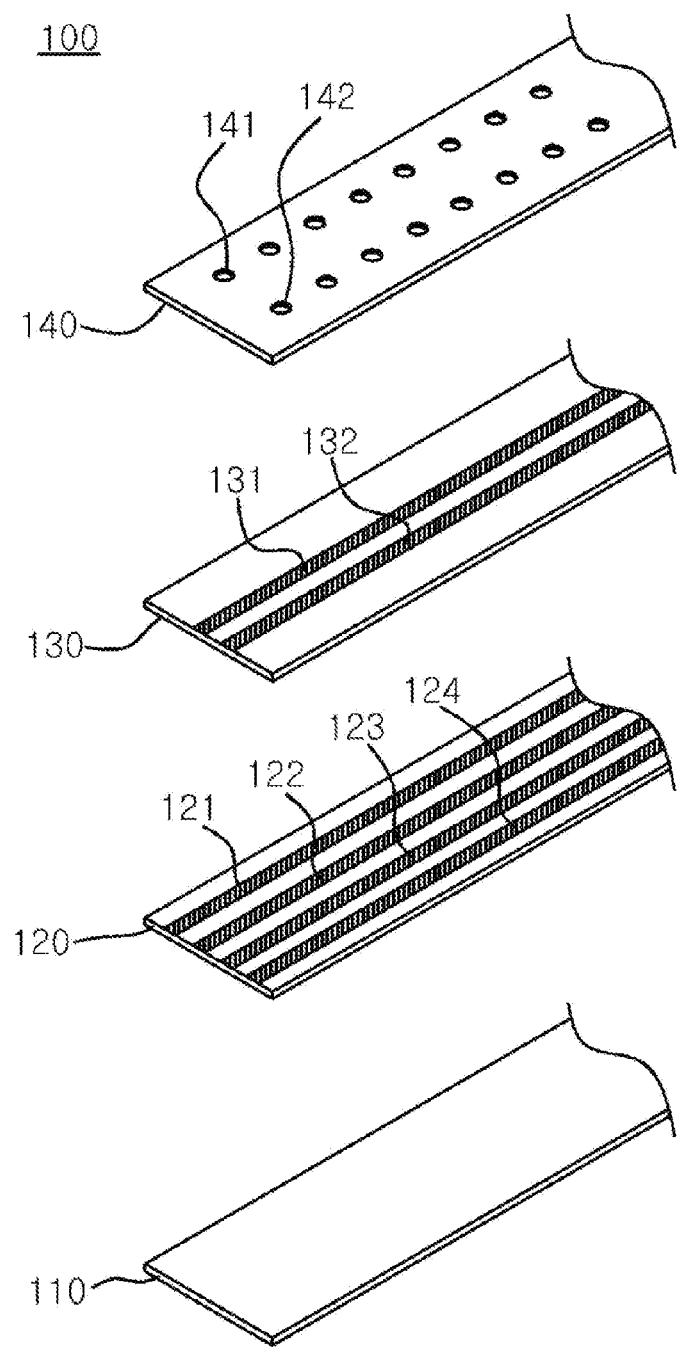
FIG. 5 is a diagram showing the structure of a leak sensing film according to the present invention.

FIG. 5 is a diagram showing the structure of a leak sensing film 100 according to the present invention. The leak sensing film 100 includes an attachment layer 110, a lower film 120, an upper film 130, and a protection film 140.

The attachment layer 110 is attached to the bottom or a wall surface and is placed under the lower film 120. A double-sided tape may be used as the attachment layer 110.

The lower film 120 is made of PET, PE, PTFE, PVC, or other Teflon series. A pair of power supply lines 121 and 122 and a pair of communication lines 123 and 124 are spaced apart from one another and disposed in parallel in a strip form in the length direction of the lower film 120 on a top surface of the lower film 120.

The power supply lines 121 and 122 and the communication lines 123 and 124 are made of conductive ink or a silver compound using a printing method.

The upper film 130 is stacked over the lower film 120. A pair of resistance lines 131 and 132 is spaced apart from each other and disposed in parallel in a strip form on a top surface of the upper film 130 in the length direction of the upper film 130. Furthermore, the pair of resistance lines 131 and 132 is made of conductive ink or a silver compound using a printing method.

The protection film 140 is stacked over the upper film 130. A plurality of sensing holes 141 and 142 is formed at locations corresponding to the resistance lines 131 and 132 in the protection film 140 in the length direction thereof in order to expose the resistance lines 131 and 132 of the upper film 130 externally.

Figure 6:
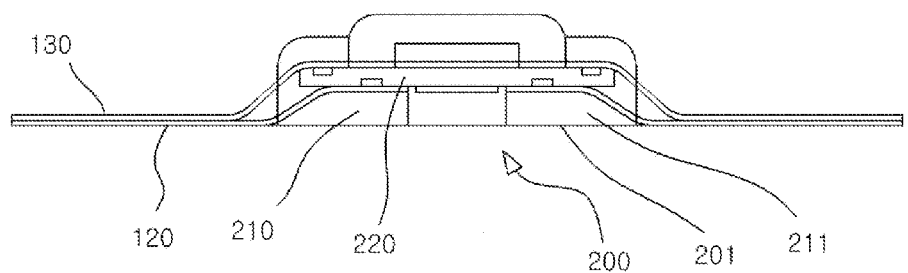
FIG. 6 is a diagram showing the structure of a slave controller to which the present invention has been applied.

In order to extend such a leak sensing film 10 at a long distance, a slave controller 200 having connectors is provided. As shown in FIG. 6, a PCB 220 is embedded within the housing 201 of the slave controller 200, and connectors 210 and 211 are provided on both sides of the PCB 220.

Accordingly, the end parts of the leak sensing films 100 are connected to the connectors 210 and 211, and thus the power supply lines 121 and 122 and the communication lines 123 and 124 of the lower film 120 and the resistance lines 131 and 132 of the upper film 130 are electrically connected to the inside of the slave controller 200.

Each of the connectors 210 and 211 includes two up and down stages. The lower film 120 is connected to a connector on the lower side, and the upper film 130 is connected to a connector on the upper side. The upper film 120 is connected to a top surface of the PCB 220 included within the slave controller 200 and the lower film 130 is connected to a bottom surface of the PCB 220 included within the slave controller 200 so that the upper film 120 and the lower film 130 are independently separated from each other.

Figure 9:
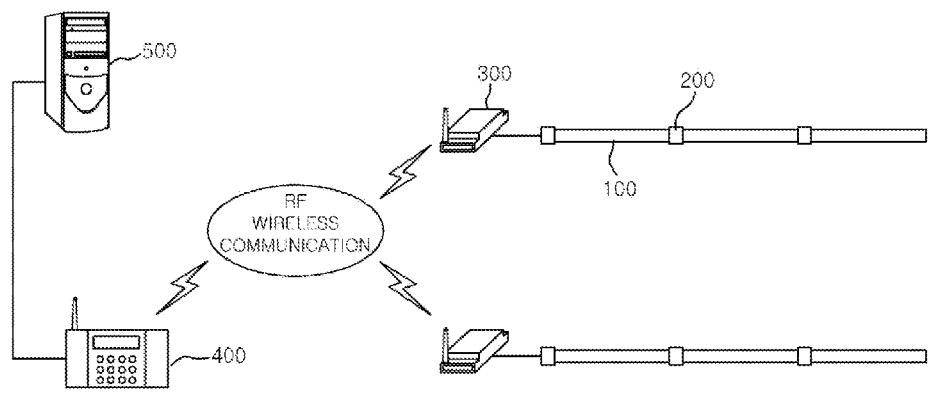
FIG. 9 is a diagram showing the construction of a remote monitoring system using the leak detection device of the present invention.

Accordingly, a plurality of the leak sensing films 100 can be continuously extended in series through such a slave controller 200, and the slave controller placed at the first stage is connected to a master controller 300 as shown in FIG. 9.

The slave controller 200 is supplied with operating power through the power supply lines 121 and 122. The power supply lines 121 and 122 and the signal lines 123 and 124 connected to the connector 210 on one side are connected to the connector 211 on the other side, thus transferring power and signals from the master controller 300 to an adjacent slave controller.

Figure 7:
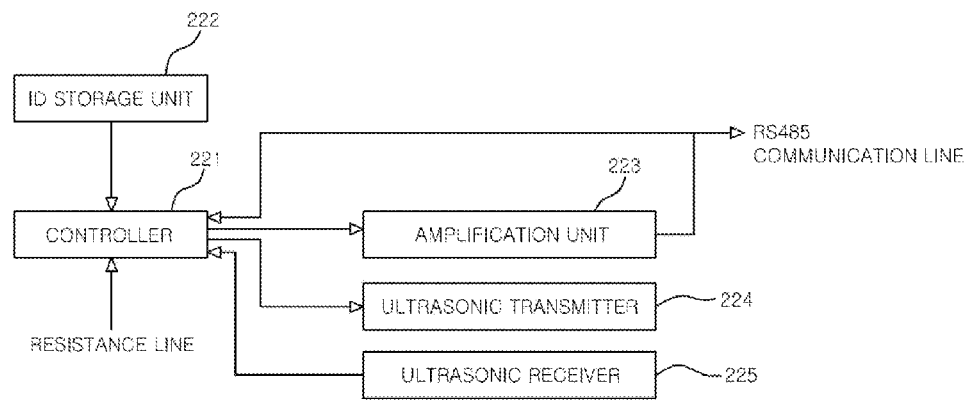
FIG. 7 is a diagram showing the circuit construction of the slave controller.

FIG. 7 is a diagram showing the structure of a circuit unit including a controller 221 mounted on the PCB 220 of the slave controller 200. The circuit unit is supplied with operating power through the power supply lines 121 and 122. The controller 221 receives a control command from the master controller 300 and sends leak sensing data through the communication lines 123 and 124 (e.g., RS485).

Figure 8:
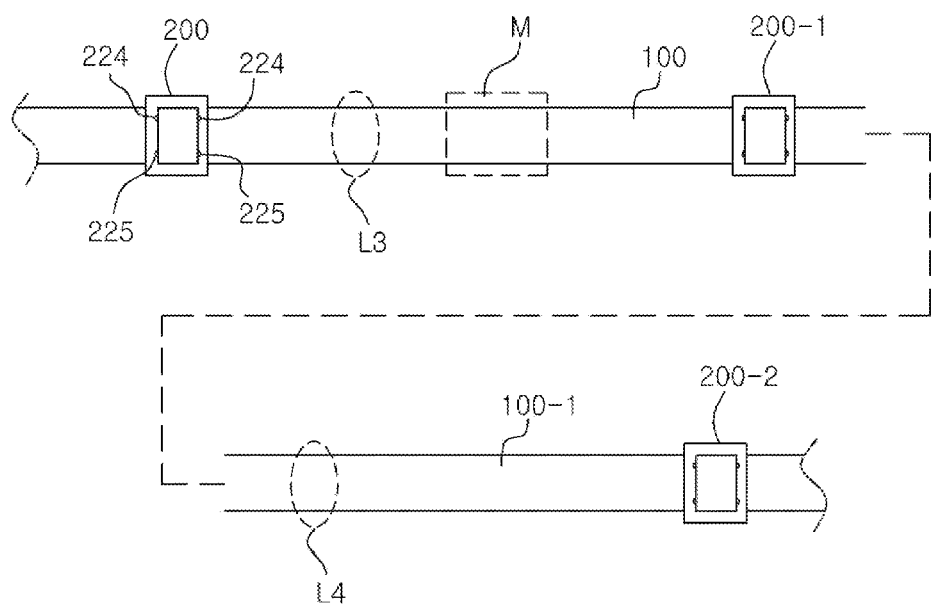
FIG. 8 is a diagram illustrating a sensing state when an object is placed over the leak sensing film.

As shown in FIG. 8, when a leak L1 is generated and introduced through the sensing holes 141 and 142, the resistance lines 131 and 132 become conductive. The controller 221 recognizes such a conduction state, adds its own ID stored in an ID storage unit 222 to a leak sensing signal, and sends the leak sensing signal to an amplification unit 223.

The ID may be a digital signal or an analog signal level of a slave controller itself.

To this end, the controller 221 may include an A/D converter for converting the leak sensing signal of an analog form into a digital signal or an analog signal into a digital signal level.

The amplification unit 223 amplifies the leak sensing signal to a size suitable for being transmitted and sends the amplified leak sensing signal to the master controller 300 through the communication lines 123 and 124.

Meanwhile, a plurality of leaks L3 and L4 can be generated over the leak sensing films 100 and 100-1 as shown in FIG. 8. The leak L3 has been generated between the slave controller 200 and a slave controller 200-1 adjacent to the slave controller 200. The slave controllers 200 and 200-1 transmit leak sensing signals to which respective IDs have been attached to the master controller 300 through the communication lines 123 and 124.

Accordingly, the master controller 300 can recognize that the leak L3 has been generated between the slave controllers 200 and 200-1.

Likewise, the leak L4 generated simultaneously with the leak L3 has been generated from the leak sensing film 100-1 between the slave controller 200-1 and a slave controller 200-2 adjacent to the slave controller 200-1. The slave controller 200-2 can add its own ID to a leak sensing signal and transmit the leak sensing signal to the master controller 300 through the communication lines 123 and 124.

Accordingly, although multiple leaks are generated, the slave controllers placed on both sides of a position where a leak has occurred can determine whether or not the leak has occurred and accurately check a position where the leak has occurred.

Meanwhile, if an object M is placed on a top surface of the leak sensing film 100, 100-1, . . . , as shown in FIG. 8, a leak may not be detected because the object M hinders the detection of the leak although the leak is generated.

In order to detect a leak in the case where the object M is placed as described above, an ultrasonic transmitter 224 and an ultrasonic receiver 225 are placed on both sides of each of the slave controllers 200, 200-1, 200-2, . . . , in the direction along which the slave controllers face each other. The controller 221 of the slave controller outputs its own ID to the ultrasonic transmitter 224, and the ultrasonic transmitter 224 adds the ID to an ultrasonic signal and sends the ultrasonic signal to an adjacent slave controller.

The ultrasonic receiver 225 receives the ultrasonic signal from the adjacent slave controller and provides the received ultrasonic signal to the controller 221. Here, the controller 221 extracts the ID from the ultrasonic signal. If the extracted ID is an ID of the adjacent slave controller, the controller 221 determines that the ultrasonic signal has been normally received without being hindered by the object M.

If the extracted ID is its own ID, the controller 221 determines that the object M has been placed on a top surface of the leak sensing film 100 because the ultrasonic signal is reflected from the object M and received, adds its own ID to an object sensing signal, and transmits the object sensing signal to the master controller 300 through the amplification unit 223 and the communication lines 123 and 124, so that an alarm is generated.

Furthermore, the same function and effect can be achieved although the ultrasonic transmitter 224 and the ultrasonic receiver 225 are replaced with an infrared transmitter and an infrared receiver.

FIG. 9 is a diagram showing the construction of a remote monitoring system using the leak detection device of the present invention. The remote monitoring system is configured such that a leak sensing signal and an object detection signal detected by the slave controller 200 are transmitted to the master controller 300. A plurality of the remote monitoring systems may be installed.

The master controller 300 includes a wireless communication module for wirelessly transmitting the leak sensing signal and the object sensing signal, received from the slave controller 200, to an integrated alarm module 400. The integrated alarm module 400 receives leak sensing signals from a plurality of the master controllers 300 and transmits the leak sensing signals to a local PC 500 through RS485 communication.

Accordingly, the local PC 500 determines whether or not a leak has occurred and generates an alarm based on a result of the detection of an object in response to the leak sensing signal and the object sensing signal. For example, the local PC 500 may connect to a mobile communication network and provide an alarm to an administrator through a text message. For another example, the local PC 500 may inform an administrator of a current state through e-mail.

In an embodiment, the local PC 500 may store such state data in its database and manage the state data.

If the local PC 500 is sought to transmit a specific control command, that is, a command for controlling sensing sensitivity, a signal level, and an amplification rate, to the slave controller 200, the control command from the local PC 500 may be transmitted to the integrated alarm module 400 through RS485 communication. The master controller 300 may wirelessly receive the control command from the integrated alarm module 400 and send the received control command to the slave controller 200 through the communication lines 123 and 124 (e.g., RS485) of the leak sensing film 100.

Accordingly, the controller 221 of the slave controller 200 can execute the control command.

As described above, in accordance with the present invention, although leaks are generated at several places, rapid measures can be taken because whether or not the leaks have occurred can be determined and even positions where the leaks have occurred can be accurately checked. Furthermore, a leak sensing signal is transmitted to a local PC at a remote place through the master controller, an alarm is provided to an administrator at the remote place, and such state data is stored and managed. Accordingly, there is an advantage in that instant and efficient measures can be taken when a leak is generated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A leak detection device, comprising:
a leak sensing film formed on a top surface of a base film in a tape form and configured to have a pair of resistance lines for detecting a leak formed in parallel in a length direction of the leak sensing film; and
a plurality of slave controllers configured to extend a plurality of the leak sensing films by connecting a plurality of the leak sensing films in series,
wherein when a leak is detected from a leak sensing film, slave controllers connected to both ends of the leak sensing film add their own IDs to respective leak sensing signals and send the leak sensing signals to a master controller.

2. The leak detection device of claim 1, wherein:
each of the leak sensing films comprises two stacked layers,
a pair of power supply lines and a pair of communication lines are spaced apart from one another and formed in parallel in a lower layer of the two stacked layers in the length direction, and
resistance lines are formed in parallel in an upper layer of the two stacked layers in the length direction.

3. The leak detection device of claim 1, wherein the slave controller sends the leak sensing signal to the master controller through the communication lines formed in the lower layer of the leak sensing film.

4. The leak detection device of claim 1, wherein:
the slave controller is configured to be supplied with operating power from the master controller through the power supply lines, and
the slave controller comprises:
connectors each for connecting the lower layer and the upper layer of the leak sensing film at both ends of the slave controller;
an ID storage unit for storing an ID of the slave controller inside the slave controller;
a controller for receiving the leak sensing signal from the communication lines of the leak sensing film, adding the ID stored in the ID storage unit to the leak sensing signal, and outputting the leak sensing signal; and
an amplification unit for receiving the leak sensing signal of the controller, amplifying the received leak sensing signal, and sending the amplified leak sensing signal to the master controller through the communication lines.

5. The leak detection device of claim 1, wherein:
the slave controller comprises ultrasonic or infrared transmitter and receivers disposed at a place where the slave controller faces an adjacent slave controller, and
when an ultrasonic signal or an infrared signal having its own ID is received, the slave controller sends a sensing signal including the own ID to the master controller.

6. A remote monitoring system using a leak detection device of claim 1, comprising:
a wireless communication module provided in a master controller of the leak detection device and configured to wirelessly send a leak sensing signal received from a slave controller;

an integrated alarm module provided at a remote place and configured to wirelessly receive the leak sensing signal from the wireless communication module and send the received leak sensing signal; and a local PC configured to receive the leak sensing signal from the integrated alarm module, store and manage the received leak sensing signal, and generate an alarm according to whether or not a leak has occurred.

7. The leak detection device of claim 2, wherein the slave controller sends the leak sensing signal to the master controller through the communication lines formed in the lower layer of the leak sensing film.

8. The leak detection device of claim 2, wherein:

the slave controller is configured to be supplied with operating power from the master controller through the power supply lines, and the slave controller comprises:

connectors each for connecting the lower layer and the upper layer of the leak sensing film at both ends of the slave controller;

an ID storage unit for storing an ID of the slave controller inside the slave controller;

a controller for receiving the leak sensing signal from the communication lines of the leak sensing film, adding the ID stored in the ID storage unit to the leak sensing signal, and outputting the leak sensing signal; and an amplification unit for receiving the leak sensing signal of the controller, amplifying the received leak sensing signal, and sending the amplified leak sensing signal to the master controller through the communication lines.

* * * * *